US009593928B2

(12) United States Patent
Sprenger

(10) Patent No.: US 9,593,928 B2
(45) Date of Patent: *Mar. 14, 2017

(54) DYNAMICAL MONITORING OF A COORDINATE MEASURING MACHINE USING RECURSIVE FILTERING

(71) Applicant: Hexagon Technology Center GmbH, Heerbrugg (CH)

(72) Inventor: Bernhard Sprenger, Widnau (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 496 days.

This patent is subject to a terminal disclaimer.

(21) Appl. No.: 14/172,780

(22) Filed: Feb. 4, 2014

(65) Prior Publication Data

US 2014/0222373 A1 Aug. 7, 2014

(30) Foreign Application Priority Data

Feb. 5, 2013 (EP) .................................... 13153991

(51) Int. Cl.
G01B 21/00 (2006.01)
G01B 5/008 (2006.01)
G01B 21/04 (2006.01)

(52) U.S. Cl.
CPC ........... *G01B 5/008* (2013.01); *G01B 21/045* (2013.01); *G05B 2219/37193* (2013.01); *G05B 2219/41146* (2013.01); *G05B 2219/49181* (2013.01)

(58) Field of Classification Search
CPC ................. G01B 5/008; G01B 21/045; G05B 2219/37193; G05B 2219/41146; G05B 2219/49181
See application file for complete search history.

(56) References Cited

U.S. PATENT DOCUMENTS 5,610,846 A * 3/1997 Trapet ................. G01B 21/045 702/41
2003/0079358 A1 5/2003 Nai et al.
(Continued)

FOREIGN PATENT DOCUMENTS

CN 102636149 A 8/2012
EP 1 559 990 A2 8/2005
(Continued)

OTHER PUBLICATIONS

Masreliez et al., Robust Bayesian Estimation for the Linear Model and Robustifying the Kalman Filter, IEEE Transactions on Automatic Control, Jun. 1977, pp. 361-371.
(Continued)

*Primary Examiner* — Elias Desta
(74) *Attorney, Agent, or Firm* — Maschoff Brennan

(57) ABSTRACT

A method for providing dynamic state information for a coordinate measuring machine that includes a base, a probe head, a machine structure with structural components linking the probe head to the base and a drive mechanism that moves the probe head relative to the base. A dynamic model is defined with actual state variables related to physical properties representing an actual state of the coordinate measuring machine. The actual state is derived by a calculation based on the dynamic model. A filtering process using the dynamic model includes deriving prediction variables based on the state variables that describe an expected proximate state of the coordinate measuring machine, measuring at least one of the state variables and determining observables, deriving successive state variables by comparing the prediction variables with the observables and updating the dynamic model using the successive state variables as the actual state variables.

20 Claims, 4 Drawing Sheets

(56) References Cited

U.S. PATENT DOCUMENTS

2012/0246953 A1* 10/2012 Engel ............... G01B 21/047
       33/502
2013/0010070 A1    1/2013 Tateno et al.

FOREIGN PATENT DOCUMENTS

| EP | 1 687 589 B1 | 9/2012 |
| EP | 2 762 829 A1 | 8/2014 |
| EP | 2 762 830 A1 | 8/2014 |
| GB | 2 425 840 A | 4/2005 |
| WO | 02/04883 A1 | 1/2002 |
| WO | 2005/080134 A1 | 6/2005 |

OTHER PUBLICATIONS

European Search Report dated Apr. 8, 2013 as received in Application No. EP 13 15 3991.

Yang et al., "Dynamic error modeling of CMM based on Bayesian statistical principle" Proceedings of SPIE, vol. 7130, Dec. 17, 2008, pp. 71300H-71300H-7.

Giampaolo et al., À la Kalman Filtering for Metrology Tool With Application to Coordinate Measuring Machines IEEE Transactions on Industrial Electronics, vol. 59, Issue 11, Nov. 1, 2012, pp. 4377-4382.

* cited by examiner

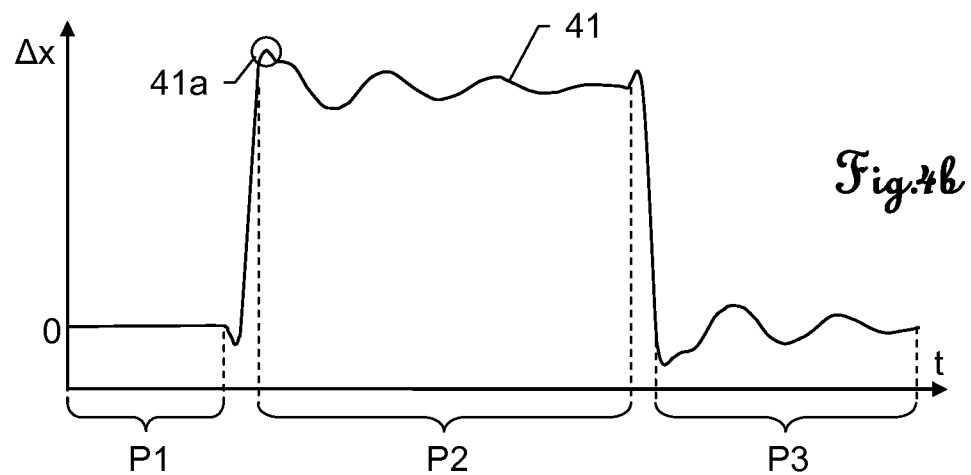
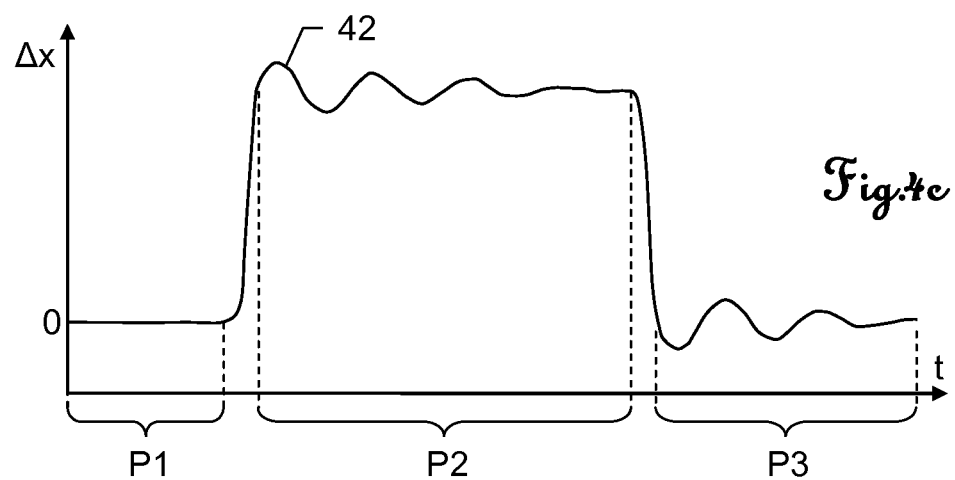
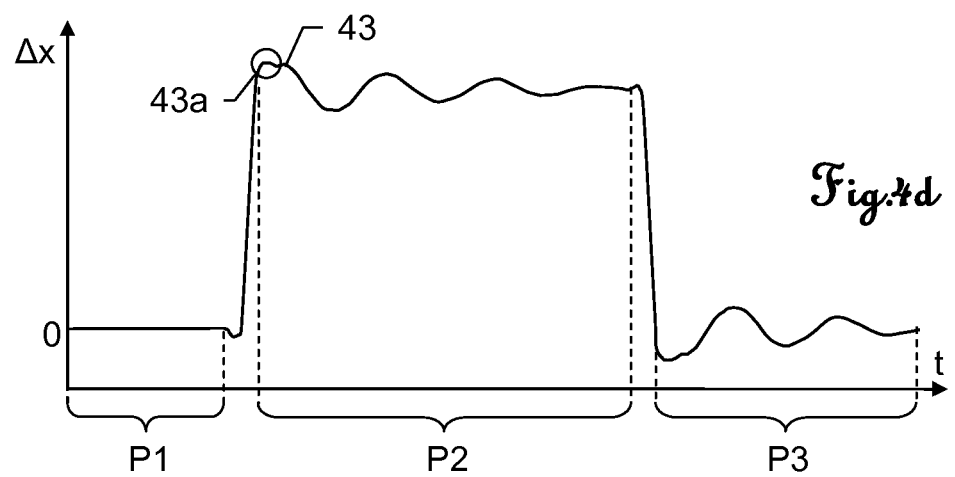

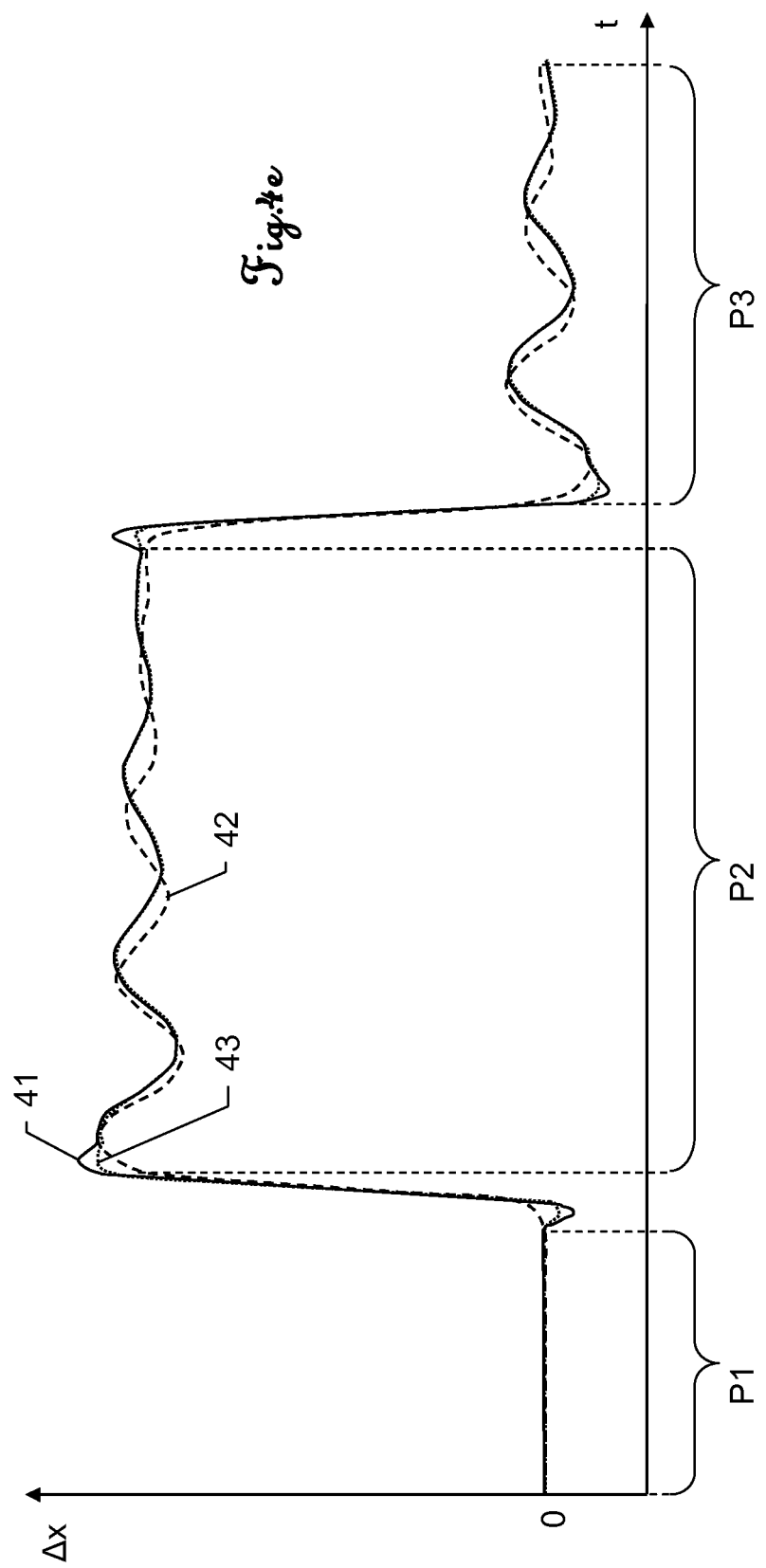

DYNAMICAL MONITORING OF A COORDINATE MEASURING MACHINE USING RECURSIVE FILTERING

FIELD OF THE INVENTION

The present invention generally pertains to a method for providing dynamic state information of a coordinate measuring machine (CMM) by help of Kalman-Filtering and to a coordinate measuring machine being adapted for execution of such method.

BACKGROUND

It is common practice to inspect work pieces subsequent to production on a coordinate positioning apparatus, such as a coordinate measuring machine (CMM), in order to check for correctness of predefined object parameters, like dimensions and shape of the object.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probe) carried by the probe head.

In a simple form of the machine a suitable transducer mounted parallel to each axis is able to determine the position of the probe head relative to a base of the machine and, therefore, to determine the coordinates of a measurement point on the object being approached by the sensor. For providing movability of the probe head a typical coordinate measuring machine may comprise a frame structure on which the probe head is arranged and driving means for moving frame components of the frame structure relative to each other.

For measuring surface variations, both measurement principles based on use of tactile sensors and of optical sensors are known.

In general, to provide a coordinate measuring machine with an improved measurement precision, its frame structure is therefore usually designed to have a high static stiffness. In order to achieve a stiff and rigid machine design, the frame structure or at least parts of it, is often made of stone, such as granite. Besides all the positive effects like thermal stability and good damping properties, the granite also makes the machine and the movable frame elements quite heavy. The high weight on the other side also requires high forces for a decent acceleration.

There are still several possible sources of error, if such technique is employed. Resonances or vibrations of machine parts when moving one frame component relative to another component are just two examples for dynamic errors. Additionally, static errors like lack of straightness in movement and of orthogonality of the axes or lateral offset in the linear drive mechanisms may occur.

According to many approaches the mentioned errors are only analyzed statically, although they also comprise dynamic factors which are dependent on the movement of the axes, in particular dependent on the position, speed, acceleration and jerk when moving the axis. With the speed-dependent calibration, this fact is taken into account in a rather simple and inflexible way. While the static errors can be numerically reduced by the use of position calibration matrices, things get much more complex when trying to compensate the dynamic errors.

The calibration gets even more complex when taking into account the dynamic errors, such as mentioned vibrations or resonance or dynamic forces etc. which errors can not only influence the axis on which they are occurring, but which can also "crosstalk" to other axes and cause errors in other parts of the system. Furthermore, the underlying effects can also be dependent on environmental conditions such as temperature, humidity, air-pressure, etc. and in particular, they will also vary over the lifetime of the machine.

In that context, for example, it has to be considered that accelerations of one axis of the machine (which can move further perpendicular axes and the probe head), can cause linear and angular dynamic deflections of the whole frame of the coordinate measuring machine, which in turn cause measurement uncertainties and errors. These dynamic measurement errors may be reduced by taking measurements at low accelerations, e.g. by a consequently optimized trajectory of desired movement.

Known approaches are trying to suppress deflections, vibrations and/or oscillations caused by the acceleration of the machine by a technology called input-shaping, which controls the regulating variable, e.g. the force or current of a propulsion motor, in such a way as to bypass mechanical resonances and avoid a stimulation of resonance frequencies or even actively counterforce oscillations by a accordingly manipulated variable on the output to the driving actuator control.

Also model predictive control, as a form of control in which the current control action is obtained by solving at each sampling instant a finite horizon open-loop optimal control problem, using the current state of the plant as the initial state, can be applied to CMMs. The optimisation yields an optimal control sequence and the first control in the sequence is then applied to the plant.

Exemplarily for error handling, EP 1 559 990 discloses a coordinate measuring system and method of correcting coordinates measured in a coordinate measuring machine, measuring geometrical errors while parts with various weights are mounted on the coordinate measuring machine. Compensation parameters are derived from measured results per a weight of a part and stored. A compensation parameter corresponding to a weight of a part to be measured is appropriately read out to correct measured coordinates of the part to be measured.

As a further example, EP 1 687 589 discloses a method of error compensation in a coordinate measuring machine with an articulating probe head having a surface detecting device. The surface detecting device is rotated about at least one axis of the articulating probe head during measurement. The method comprises the steps of: determining the stiffness of the whole or part of the apparatus, determining one or more factors which relate to the load applied by the articulating probe head at any particular instant and determining the measurement error at the surface sensing device caused by the load.

Another approach for error correction of work piece measurements with a coordinate measuring machine (CMM) is disclosed in GB 2 425 840. Thereby, position measurements are taken with a work piece sensing probe, in which means of measuring acceleration are provided. The measurements are corrected for both high frequency (unrepeatable) errors such as those due to vibration, and low frequency (repeatable) errors such as those due to centrifugal forces on the probe. The correction method comprises measuring the work piece, determining repeatable measurement errors from a predetermined error function, error map or error look-up table, measuring acceleration and calculating unrepeatable measurement errors, combining the first and second measurement errors to determine total errors and correcting the work piece measurements using the total errors. The predetermined error map is calculated using an artefact of known dimensions.

It is also known to use accelerometers fitted in the probe or on other moving parts of the measurement machine, e.g. the Z-column and/or in the base table, allowing a differential measurement and/or the evaluation of externally applied vibrations. In such an arrangement, the displacements and errors of the probe-position can be measured with double integration and, based on this information, it is possible to adjust the reading with the difference between the doubly integrated signal and the scales. For instance, such a quasi-static approach is disclosed by WO 02/04883.

For handling above mentioned errors, in particular dynamic errors, usually a suitable model of the CMM is to be defined, wherein a positioning behaviour of especially the frame structure of the CMM is enabled to be described based on that model. Exemplarily, a look-up table may be defined in order to lookup a correction value correlated with an actual positioning of the frame components of the CMM. Such modelling of a CMM becomes more important along with weight (and stiffness) reduction of CMM-parts.

Weight reduction is a main topic relating to the designs of coordinate measuring machines, as if the machine components are built comprising less weight (and less stiffness) faster positioning of respective components can be achieved by causing fewer force affecting the coordinate measuring machine. On the other hand the influence of machine vibrations and torsions caused by reduced stiffness and (faster) movement of the machine components increase with weight reduction of these parts. Thus, uncertainties of derived measurement values and errors occurring from such deformations and vibrations increase accordingly. Known modelling for providing error compensation of coordinate measuring machines does not enable to calculate and compensate for the increased amount of errors influencing the measuring performance of a CMM. Moreover, such modelling does not enable to handle or to determine different kinds of errors continuously with high precision in order to compensate measuring values derived with weight reduced CMMs.

Since models are only an approximation of reality, they are prone to errors due to parameter inaccuracy and modelling simplifications. Especially, when the model system includes one or more natural modes with low damping, these errors can become significant. The model-reality mismatch may be caused by a simplified model, by inaccurate model parameters, such as masses, inertias, stiffness values, damping values or geometrical properties, or by time- and/or position-varying parameters, such as air-bearing stiffness and damping.

Whereas masses, inertias, geometrical properties and stiffness values can accurately be determined from e.g. CAD models, the retrieval of damping values or bearing characteristics is more challenging. Parameters especially prone to mismatch are the air bearing stiffness and damping values, since they vary in a nonlinear behaviour with air bearing pressure change, orientation changes, surface characteristics and the movement speed.

Often the input variables of the model (e.g. acceleration) exhibit large measurement noise, sometimes due to cross-coupling into the sensing axis (e.g. from an acceleration sensor). These input variables (sensor data) may be low-pass filtered, which introduces frequency dependent phase shifts (and frequency dependent delays) and, thus, this introduces errors in the calculation of the deflection.

SUMMARY

It is therefore an object of the present invention to provide an improved method for providing model-based calculations of an actual state of a CMM, wherein above mentioned model-reality mismatches are reduced by the calculations, in particular wherein a calculation of deflections is provided continuously.

A further object of the present invention is to provide calculation of corrected position values from system parameters relating to the model and to derive error values for the positions.

Yet another object of the present invention is to provide an improved method for determining machine vibrations and/or deformations of a CMM and, particularly, for compensation of errors cause by such vibrations and/or deformations.

The invention relates to a method for providing dynamic state information for at least a part of a coordinate measuring machine, the coordinate measuring machine comprising a base, a probe head, a machine structure with structural components for linking the probe head to the base and at least one drive mechanism for providing movability of the probe head relative to the base. A dynamic model is defined with an actual set of state variables, the state variables being related to a set of physical properties of at least the part of the coordinate measuring machine and representing an actual state of at least the part of the coordinate measuring machine, and the actual state of at least the part of the coordinate measuring machine is derived by a calculation based on the dynamic model.

According to the invention, a filtering process is executed with the dynamic model, in particular using Kalman-filtering, with deriving a set of prediction variables based on the state variables, the set of prediction variables describing an expected proximate state of at least the part of the coordinate measuring machine, measuring at least one of the physical properties and determining a set of observables based on the measuring, deriving a set of successive state variables by comparing the set of prediction variables with the set of observables, the successive state variables providing an adjusted representation of the proximate state of at least the part of the coordinate measuring machine, and updating the dynamic model using the set of successive state variables as the actual set of state variables.

With a particular embodiment of the invention, the filtering process is designed as a linear quadratic estimator and/or as a recursive filtering procedure and/or as Kalman-Filter and/or as Extended Kalman-Filter.

Referring to the filtering process according to the invention, filtering (and modelling) is performed in recursive manner. Basically, the filtering is done by predicting variables, physically measuring related values to the variables (=determining the observables), aggregating (combining and comparing) predictions and measurements and deriving new variables (estimates of variables). According to the invention, such filtering generally also is executable using a Kalman-Filter and is described in more detail below mainly referring to Kalman-Filtering. However, the invention is not limited to the use of Kalman-Filters but also other recursive filter approaches—linear and/or non-linear filters—may be used in context with the present invention.

The filtering process is based on recursive estimations of variables, wherein accordingly the Kalman-Filter is a recursive estimator. This means that (only) the estimated state from a previous time step and current measurements are needed to compute estimates (actualised state variables) for a current state. Thus, no history of observations and/or estimates is required.

The Kalman-Filter can be written as a single equation, but typically is conceptualized as two distinct phases: "Predict" and "Update". The predict phase uses the state variables from the previous time step to produce an estimate of the state at the current time step. This predicted state estimate is also known as the "a priori" state estimate because, although it is an estimate of the state at the current time step, it does not include observation information from the current time step. In the update phase, the current "a priori" prediction is combined with current observation information (e.g. measurements related to the state variables or physical properties, respectively) to refine the state estimate. This improved estimate is termed the "a posteriori" state estimate.

Typically, the two phases alternate, with the prediction advancing the state until the next scheduled observation, and the update incorporating the observation. Alternatively, in case an observation is unavailable for some reason, the update may be skipped and multiple prediction steps may be performed or not the next, but the next but one step is performed. Likewise, if multiple independent observations are available at the same time, multiple update steps may be performed (typically with different observation matrices).

In principle, the Kalman-Filter uses a system's dynamics model (e.g. physical laws of motion) and multiple sequential measurements (such as from sensors), particularly known control or excitation inputs to that system, to form an estimate of the system's varying quantities (i.e. variables describing the state of the system) that is better than the estimate obtained by using measurements alone. As such, it is a common sensor fusion and data fusion algorithm.

Particularly, all measurements and calculations based on models are estimates to some degree, e.g. noisy sensor data, approximations in the equations that describe how a system changes and external factors that are not accounted for introduce some uncertainty about the inferred values for a system's state. The Kalman-Filter may average a prediction of a system's state with a new measurement using a weighted average. The purpose of the weights is that values with better (i.e. smaller) estimated uncertainty are "trusted" more. The weights typically are calculated from the covariance, a measure of the estimated uncertainty of the prediction of the system's state. The result of the weighted average is a new state estimate that lies in between the predicted and measured state and has a better estimated uncertainty than either alone. This process is repeated every time step with the new estimate and its covariance informing the prediction used in the following iteration. This means that the Kalman-Filter works recursively and requires only the last "best guess"—not the entire history—of a system's state to calculate a new successive or proximate state.

Concerning to different types of filters, the Kalman-Filter can be considered to be one of the simplest dynamic Bayesian networks. The Kalman-Filter calculates estimates of the true values of measurements recursively over time using incoming measurements and a mathematical process model. Similarly, recursive Bayesian estimation calculates estimates of an unknown probability density function (PDF) recursively over time using incoming measurements and a mathematical process model (cf. C. Johan Masreliez, R. D. Martin (1977); "Robust Bayesian estimation for the linear model and robustifying the Kalman filter", IEEE Trans. Automatic Control). In recursive Bayesian estimation, the true state is assumed to be an unobserved Markov process, and the measurements are the observed states of a hidden Markov model (HMM).

The basic Kalman-Filter typically relates to a linear assumption. More complex systems, however, can be non-linear, wherein non-linearity can be associated either with the process model or with the observation model or with both (modelled with the extended Kalman-Filter). Moreover, non-linearities can also be linearised at current state and than used with basic Kalman-Filter.

In the extended Kalman-Filter (EKF), the state transition and observation models need not be linear functions of the state but may instead be non-linear functions. These functions are of differentiable type. Such a first function can be used to compute the predicted state from the previous estimate and similarly such a second function can be used to compute the predicted measurement from the predicted state. However, the two functions cannot be applied to the covariance directly. Instead a matrix of partial derivatives (the Jacobian) is computed.

At each time step the Jacobian is evaluated with current predicted states. These matrices can be used in the Kalman-Filter equations. This process essentially linearizes the non-linear function around the current estimate.

More detailed information concerning the principles of recursive filtering approaches can be found e.g. in "Kalman Filtering—Theory and Practice Using MATLAB", Mohinder Grewal, Angus Andrews, John Wiley and Sons, $3^{rd}$ edition, September 2008; or in "Optimal State Estimation: Kalman, H infinity, and Nonlinear Approaches", D. Simon, Wiley-Interscience, $1^{st}$ edition, June 2006.

In contrast to just integrating acceleration signals as known from prior art (e.g. to derive velocity or position information), using the open-loop modelling and filtering according to the invention enables to reduce errors due to model-reality mismatch, especially errors due to low damping modes. Moreover, the identification and/or estimation of parameters especially are useful to identify, estimate and/or track varying or unknown parameters, e.g. air-bearing stiffness and damping parameters which can vary over time. A further advantage of the method according to the invention is the possibility of filtering sensor data with low (or even no) phase delay, and thus, with low (or even no) time delay. Noise reduction is optimised and a sensor fusion with sensor weighting is enabled. Not only errors induced by controlled machine movements but also errors induced by machine environment (e.g. by additional machines operated in the same production hall) are enabled to be determined and compensated for.

According to further specific embodiments of the invention, an actual deformation and/or displacement of at least the part of the coordinate measuring machine is derived based on the dynamic model, in particular wherein the actual deformation is tracked for a predetermined time period, and/or an actual position of a designated point of the coordinate measuring machine is derived based on the dynamic model, in particular wherein the position of the designated point is tracked for a predetermined time period.

Preferably, the method of the invention is adapted to calculate deflections of at least a part of a coordinate measuring machine and, thus, particularly providing correction values for the CMM. According to a specific embodiment of the invention, calculating the absolute position of a machine part or of a designated point at the machine (including deflections and/or correction values) is provided.

Regarding specific embodiments of the invention, the prediction variables are derived performing calculations based on the dynamic model.

Moreover, according to further specific embodiments of the invention, the filtering process is performed in predefined time intervals, wherein the measuring of the at least one physical property is observed for a predefined time period. With setting a predefined time interval the accuracy and calculation time of modelling is adaptable to measuring requirements (e.g. fast vs. precise measuring).

Furthermore, the method according to the invention may be specified by adapting at least one of the successive state variables of the set of successive state variables to the prediction variables and/or to the observables of the set of observables.

In that context—according to a specific embodiment of the invention—a compensation value is derived by calculating a weighted average from the set of prediction variables and the set of observables, wherein at least one successive state variable is adjusted to the compensation value, in particular wherein the compensation value is derived from a defined prediction variable and a respective observable, particularly wherein the prediction variable, the observable and the successive state variable relate to the same physical property.

Thus, a comparison of the measured values for the state variables and the prediction values is enabled to be performed and based on that comparison respective values for the variables can be derived. For instance, one value for a variable remains the predicted value, one other value is adapted for fitting to the measured valued and a value for one another variable is set in between the measured and the predicted value.

Moreover, according to the invention, an error value may be determined by processing the set of prediction variables and the set of observables, in particular the error value is determined for at least one of the successive state variables and/or prediction variables by comparing a measuring value of respective at least one physical property with a predicted value for the respective state variable or prediction variables and/or at least one successive state variable is adapted based on the error value.

According to further specific embodiments of the invention, sensor data generated by a measurement with a respective sensor is used for deriving the set of observables and/or is filtered and adapted based on the filtering process, in order to reduce sensor noise, in particular wherein filtering and adapting of the sensor data is performed without phase delay.

Regarding possible inputs values (from sensor measurements or from an trajectory) concerning measuring the state variables and/or prediction variables and/or the model inputs in order to provide parameters for deriving the set of successive state variables, acceleration, velocity, position, displacement, orientation, bending, deformation, torque or force information or a combination of some of such inputs may be provided. Some input values may be determined by measurements and some input values may be calculated from a path-planner trajectory. Furthermore, input values might indirectly be determined by measurement of a deflection.

Particularly, the state variables, the prediction variables, the observables and/or the successive variables may define at least one of the following values and/or a change of the respective value of at least the part of the coordinate measuring machine:

mass,
inertia,
geometrical property,
stiffness,
damping,
bearing property,
torque,
temperature,
humidity,
velocity and/or
applied force.

Referring to further aspect of the invention, a settling time may be calculated and a settling signal may be generated based on the filtering procedure for compensation of a measurement performed with the coordinate measuring machine, wherein the settling time represents a duration for maintaining a defined measuring position in order to achieve predefined measuring accuracy, in particular wherein the settling signal is processed for controlling a repositioning and/or a maintaining of a defined position of the probe head relative to a measuring point or for generating an output signal, in particular a sound and/or a light signal, for providing information for an operator in order to manually measure with the predefined measuring accuracy.

Therefore, the dynamic model may be used to calculate the settling time required in order to achieve a defined accuracy during probing with the CMM. Moreover, the method may be used for optimization of trajectory limitations (e.g. regarding jerk or acceleration) in order to achieve defined accuracy during scanning movements. Thus, the use of modelling and filtering according to the invention allows to optimize measurement speeds and to increase throughput without violating accuracy target.

According to the invention, the filtering process executed with a CMM or the Kalman-Filtering, respectively, gives the possibility to identify and adapt parameters which are prone to mismatch, such as the air bearing stiffness and damping values, since they vary in a nonlinear behaviour with air bearing pressure change, orientation changes, surface characteristics, air gap and the movement speed of a CMM part. Other parameters to be identified or adapted are e.g. damping and stiffness values, the centre of masses or inertias.

Regarding the model building for providing a suitable model for the method according to the invention, several modelling approaches can be chosen.

According to a specific embodiment of the invention a modelling approach described in the European Patent Application No. EP 13153954.6, filed on 5 Feb. 2013, may be used to obtain a model with a small number of elements for e.g. a linear axis and to keep processing time quite low.

According to further embodiments of the invention, a 2D-model of the relevant parts of the CMM is employed, which is possible if cross coupling between different modelled planes can be neglected or a coupled 2D-model is defined, wherein limited cross coupling between different planes is possible, or 3D-modelling is provided according to a specific embodiment of the invention, wherein the 3D-model may be preferred, if dominant cross coupling effects between the planes are to be represented. Such modelling approaches and solving of these models e.g. are described in the European Patent Application No. EP 13153980.1, filed on 5 Feb. 2013.

The invention also relates to a coordinate measuring machine comprising a base, a probe head, a machine structure with structural components for linking the probe head to the base, at least one drive mechanism for providing movability of the probe head relative to the base and a controlling and processing unit adapted for execution of a modelling functionality. On execution of the modelling functionality a dynamic model with an actual set of state variables is defined, the state variables being related to a set of physical properties of at least the part of the coordinate measuring machine and representing an actual state of at least a part of the coordinate measuring machine, and the actual state of at least the part of the coordinate measuring machine is derived by a calculation based on the dynamic model.

According to the invention, the modelling functionality comprises a filtering algorithm, in particular using Kalman-filtering, on execution of which a set of prediction variables is derived based on the state variables, the set of prediction variables describing an expected proximate state of at least the part of the coordinate measuring machine, and at least one of the physical properties is measured and a set of observables is determined based on the measuring. Furthermore, a set of successive state variables is generated by comparing the set of prediction variables with the set of observables, the successive state variables providing an adjusted representation of the proximate state of at least the part of the coordinate measuring machine, and the dynamic model is updated using the set of successive state variables as the actual set of state variables.

Moreover, the controlling and processing unit of the coordinate measuring machine—according to a preferred embodiment of the invention—is adapted for execution of a method according to the invention (as outlined above).

Relating to a further specific embodiment of the invention, the coordinate measuring machine comprises a sensor for monitoring the physical properties, in particular for measuring an excitation and/or an impact at the coordinate measuring machine, in particular an acceleration sensor and/or a deflection sensor and/or a vibration pick-up, in particular wherein a sensor gain is adjustable based on the calculation of the dynamic model.

According to above specific embodiment of the invention, the filtering process executed with a CMM, respectively, gives the possibility to identify and adapt parameters which are prone to mismatch and drift, such as offset and gain factors for sensor signals, such as acceleration, velocity, gyro, distance, displacement, bending, torque and/or force sensors. For instance, thermal drift behaviour of gain and/or offset of an acceleration sensor are enabled to be adjusted based on the filtering method.

Additionally, the invention relates to a computer programme product having computer-executable instructions for performing the method according to the invention, in particular when run on a controlling and processing unit of a coordinate measuring machine according to the invention.

BRIEF DESCRIPTION OF THE DRAWINGS

The method and the device according to the invention are described or explained in more detail below, purely by way of example, with reference to working examples shown schematically in the drawings. Specifically.

FIG. 4a-e exemplarily illustrate a change of one system variable over time and a displacement development caused by that change with respect to reality and to model-based calculations, in particular to a model-based calculation according to the invention.

DETAILED DESCRIPTION

Figure 1:
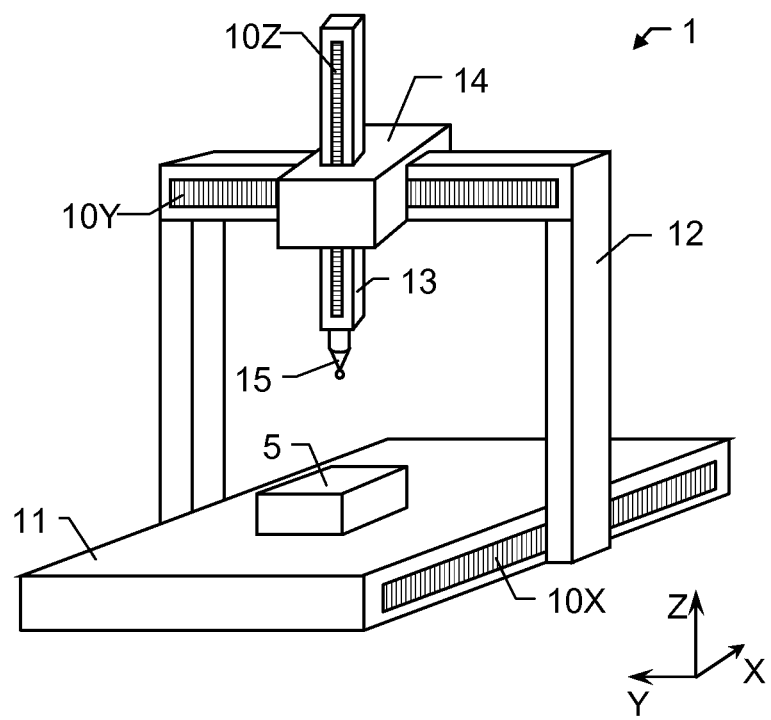
FIG. 1 shows a first exemplary embodiment of a coordinate measuring machine according to the invention.

In FIG. 1 an exemplary embodiment of a portal coordinate measuring machine 1 (CMM) according to the invention is depicted, the coordinate measuring machine 1 comprises a base 11 and a frame structure for linking a probe head 15 to the base 11, the frame structure comprising several frame components 12, 13, 14 being movable with respect to another. The first frame component 12 is a portal having two portal legs, which are connected by a bridging portion at their upper ends. Driven by a drive mechanism (not shown), the frame component 12 is capable to move along the longitudinal sides of the base 11. This direction corresponds to a first direction X. The movement of the frame component 12 particularly is performed by a gear rack attached to the base 11, which is meshing with a pinion on the frame component 12.

A carriage 14 is movably arranged on the bridging portion of the frame component 12. The movement of the carriage 14 (which is to bee seen as a further frame component) may also be achieved by a rack and pinion. A vertical rod 13 (sleeve, Z-ram), building a further frame component, is movably incorporated into the carriage 14. At the bottom portion of the vertical rod 13 a probe head 15 is provided.

The probe head 15 is movable to any desired point in a measuring volume (work zone) of the coordinate measuring machine 1 in the directions X, Y and Z. The measuring volume is defined by the base 11 and the frame components 12, 13 and in particular by the range of movability of the carriage 14. The three space directions X, Y and Z are preferably orthogonal to one another, although this is not necessary for the present invention. It should be noted that a drive mechanism and a controller for driving the frame components and, thus, for driving the probe head 15 are not shown.

An object 5 to be measured is positioned in the space of the measuring volume on the base 11.

The probe head 15, on which a stylus is arranged exemplarily, is fastened on the lower free end of the rod 13. The stylus is used in a manner known per se for touching the object 5 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head. More generally, the probe head 15 may be designed for arranging a contact probe, e.g. a scanning or touch trigger probe, or a non-contact probe, particularly an optical, capacitance or inductance probe, or an articulated probe.

Two of the most common types of bearings between the movable members and the guides are air bearings or ball bearings (e.g. linear circulating plus rails). The air bearings give the advantage that there is no friction in the movement (which may introduce different kind of errors like angle errors or hysteresis). The disadvantage of air bearings is that the stiffness is lower than in ball bearings, so that particularly dynamic errors may occur. In ball bearing types, the stiffness in the bearing system is typically higher but there is friction and the friction forces may introduce errors. However, the invention may be applied for both types of bearings.

Summed up, the coordinate measuring machine 1 is built for determination of three space coordinates of a measurement point on an object 5 to be measured and, therefore, comprises three linear drive mechanisms for provision of movability of the probe head 15 relative to the base 11 in the first, second and third direction (X, Y and Z direction) and particularly machine components providing additional rotatory degrees of freedom (e.g. articulated probe).

Each linear drive mechanism has a linear guide, one in the first, one in the second and one in the third direction (X, Y and Z direction), respectively. In a simple embodiment, the linear guide of the X-direction drive mechanism is formed by two edge-building surfaces of the base 11, the linear guide of the Y-direction drive mechanism is formed by two or three surfaces of the bridge and the linear guide of the Z-direction drive mechanism is formed by a cubical hole in the Y-carriage member.

Furthermore, each linear drive mechanism comprises a movable member being supported for movement along the guide by bearings. In particular, the movable member of the X-direction drive mechanism is embodied as X-carriage having mutually facing surfaces with respect to the above mentioned two guiding surfaces of the base 11. The movable member of the Y-direction drive mechanism is embodied as Y-carriage 14 having mutually facing surfaces with respect to the above mentioned two or three guiding surfaces of the bridge. And, the movable member of the Z-direction drive mechanism is formed by Z-column 13 (sleeve) having mutually facing surfaces with respect to the inner surfaces of the cubical hole in the Y-carriage.

Moreover, each linear drive mechanism comprises a linear measuring instrument for determination of a first, a second or a third drive position, respectively, of each movable member in the first, the second or the third direction (X, Y and Z direction), respectively.

In this exemplary embodiment of FIG. 1, the portal legs each have a movable X-carriage which allows movement of the first frame component 12 in X-direction.

A measuring scale 10X being part of the X-measuring instrument is schematically represented on the long side of the base 11, wherein the scale 10X extends parallel to the X-direction. The scale may be a glass measuring scale, e.g. having incremental or absolute coding, with which a drive position in the X-direction of the X-carriage can be determined. It is to be understood that the measuring instrument may furthermore contain suitable sensors for reading the measuring scale 10X, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 10Y is arranged parallel to the Y-direction on the bridging portion of the first frame component 12. Finally, another measuring scale 10Z is also arranged parallel to the Z-direction on the Z-ram 14. By means of the measuring scales 10Y, 10Z as part of the linear measuring instruments, it is possible to record the present drive positions of the second frame member 14 in Y-direction and of the sleeve 13 in the Z-direction metrologically in a manner which is known per se.

In the shown embodiment, the base 11 comprises a table with a granite surface plate for supporting the object 5 to be measured, on which the space coordinates of the measurement point are intended to be determined.

Not shown is a controlling and processing unit, which is designed to actuate the motor drives of the coordinate measuring machine 1 so that the probe head 15 travels to the measurement point. The controlling and processing unit comprises a processor and a memory. In particular, the controlling and processing unit is designed for determining the three space-coordinates of the measurement point on the object 5 as a function of at least the first, the second and the third drive position of the three drive mechanisms.

For manual operation, the control unit may be connected to a user console. It is also possible for the control unit to fully automatically approach and measure measurement points of the object 5 to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Thus, the invention may generally be used with all types of coordinate measuring machines, i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine or may be designed as articulated arm. Furthermore, a CMM in context with the present invention also is to be understood as a system for precise positioning and/or precise assembling of work pieces or tools and/or for applying materials, e.g. spraying or printing of paint or other materials. Such a system is designed to provide movement and measurement of positions within a working volume defined by the structure of the respective system and defines a coordinate system, within which positioning of system components with high precision is provided. In particular, such a system provides carrying and placing of a work piece or a tool relative to a further work piece with high accuracy. For instance, a robot providing precise positioning and/or measuring abilities may be operated and controlled based on execution of the dynamic model according to the invention.

Moreover, according to the invention, the controlling and processing unit comprises a functionality for dynamical—in particular continuously—calculating deflections of the coordinate measuring machine 1 on basis of a model, the model representing at least a part of the CMM 1 by defined state variables. For deriving a precise state of the CMM 1 a filtering process is executed, wherein based on the state variables further prediction variables (estimates) are derived describing an expected successive state of the CMM 1. Additionally, the state variables or physical properties, respectively, are monitored, e.g. by measuring the physical properties, and variations concerning the values of respective state variables are determined. In a further step of the filtering process, the monitored variables (with determined variations) are compared to the prediction variables and based on the comparison a successive new set of state variables is derived. These variables represent the proximate (i.e. successive) state of the CMM 1. For instance, the comparison of the variables can be done by calculating weighted averages, wherein more weight may be given to variables with higher certainty.

The successive set of state variables is taken for updating the model. Thus, a previous set of variables is actualised based on the successive variables, in particular wherein previous variables are replaced by successive variables. For instance, a former value regarding a force at the CMM 1 is replaced by an actualised force value.

The successive state of the CMM 1 can then be calculated depending on the successive set of variables or depending on the actualised model, respectively. Thus, e.g. an actual bending or torsion of the CMM 1 or of at least the part of the CMM 1 can be derived as the successive state. Moreover, a displacement of a structure or of a designated point of the CMM 1 can be calculated and, from that, an error information concerning a displacement of the probe (or probe head 15) of the CMM 1 can be generated. Optionally, according to a further specific embodiment of the invention, a measurement values is compensated using the error information.

According to the present embodiment, above calculation (using calculated estimates and measured variables) is executed recursively by continuously updating modelling parameters (variables) and repetitively calculating the actual state of the machine with actual parameters. Therefore, a historical development of one or more model parameters can be neglected and the variables are to observed and stored for only one time-step (e.g. from a first to a second calculation of the machine state), wherein the time-step to be performed may be adapted for each calculation, i.e. a time steps may be skipped or alternating time steps are used.

Furthermore, the modelling approach according to the invention enables to track a state of at least a part of a CMM 1 and to derive a deformation or displacement of the part, respectively. Hence, defining a model and performing filtering of physical parameters and calculating an actual state of a CMM 1 according to the invention allow reduction of errors due to the dynamic behaviour of the CMM 1. Above described functionality provides an improved and precise basis for dynamically modelling machine parameters and for calculating and, particularly, correcting or compensating for deflections, i.e. for dynamically changing deflections.

Figure 2:
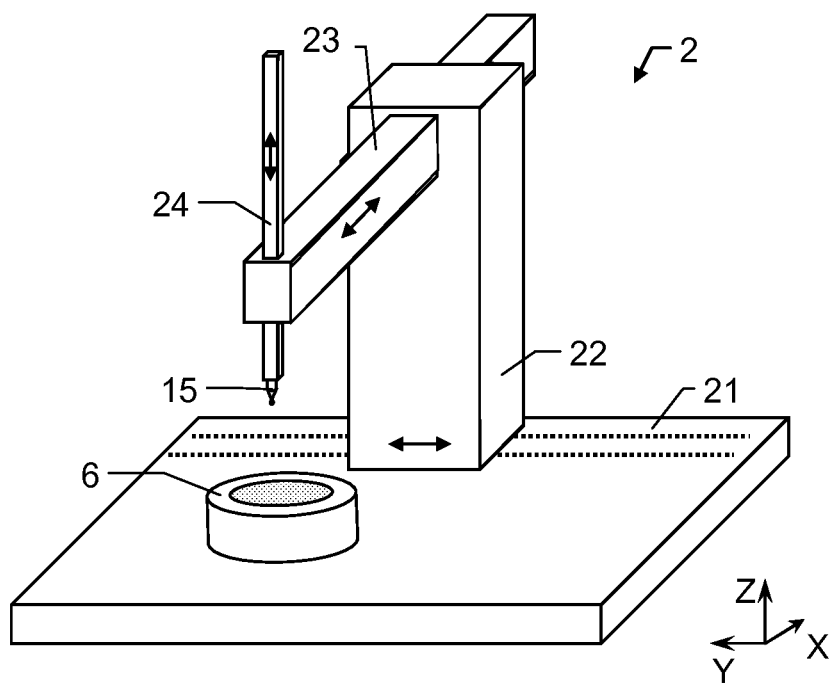
FIG. 2 shows a second exemplary embodiment of a coordinate measuring machine according to the invention.

FIG. 2 shows a second exemplary embodiment of a coordinate measuring machine 2 (CMM) according to the invention, wherein the coordinate measuring machine 2 comprises a base 21 and components 22, 23, 24 for providing movability of the probe head 15 in three directions (X-, Y- and Z-direction) relative to the base 21. For this reason, the components 22, 23, 24 are moveable relative to each other by drive mechanisms (not shown) linking the three components 22, 23, 24 and the base 21.

An object 6 to be measured is placed on the base 21. For measuring this object 6 the probe head 15 is approached to the surface of the object 6. Coordinates are determined according to a predefined measuring path on which a tactile measuring sensor at the probe head 15 is guided and the surface profile of the object is determined depending on that measurement.

The machine 2 further comprises a memory unit on which object data is stored. After deriving surface data for the object 6 by measurement, this data is compared to the object data stored in the memory unit and possible variations in the surface are identified on basis of comparing the data.

Moreover, a model providing actual state information regarding position and/or deflection of the CMM 2 (or of at least a part of the CMM 2) is defined. The model is built on basis of state variables representing physical properties of the part of the CMM 2 and the state variables are stored in a data storage device. An actual state for the part of the CMM 2 (i.e. a position of a structural component and/or a deflection of said component) can be derived by calculations based on that model. For calculation of that actual state a filtering process is defined and executed, wherein estimators are calculated from the state variables and at least one physical property of the state variables are monitored (i.e. measured) for a predetermined time period. The monitoring may be performed by attaching specific sensors (e.g. acceleration sensors or strain gauges) at the CMM 2 and tracking signals produced by the sensor.

A successive set of state variables is defined based on the monitoring and on the calculated estimators wherein the successive set may comprise variable values being equal to the values of the preceding set of variables and may comprise values differing from the values according to the preceding set. E.g. a velocity parameter concerning a frame component remains constant but a bending value (which e.g. is measured with a strain gauge) decreases over a monitored time period. By calculating a new actual state of the coordinate measuring machine 2 from the successive set, the monitored change of the variables (i.e. of the physical properties) and the estimates to the variables are considered e.g. by building weighted averages and defining the successive variables from the averages.

In context with the present invention, a set of actuating (correcting) variables may be provided with the dynamic model and the successive set of state variables is determined by additionally processing the actuating (correcting) variables, which may be derived from a trajectory or from performed measurements.

With such method a change of physical parameters of the CMM 2 and of the variables of the model representing the CMM 2 can be tracked and based on that change and on calculation based on that change a real dynamical description of the behaviour of the modelled CMM part is enabled. Therefore, for instance bending, displacement, torsion and/or vibration of at least one part of the CMM 2 can be derived on basis of the model. In addition, corresponding errors may be determined from the model and the errors may be corrected by charging derived error values against actual measured position values.

Figure 3:
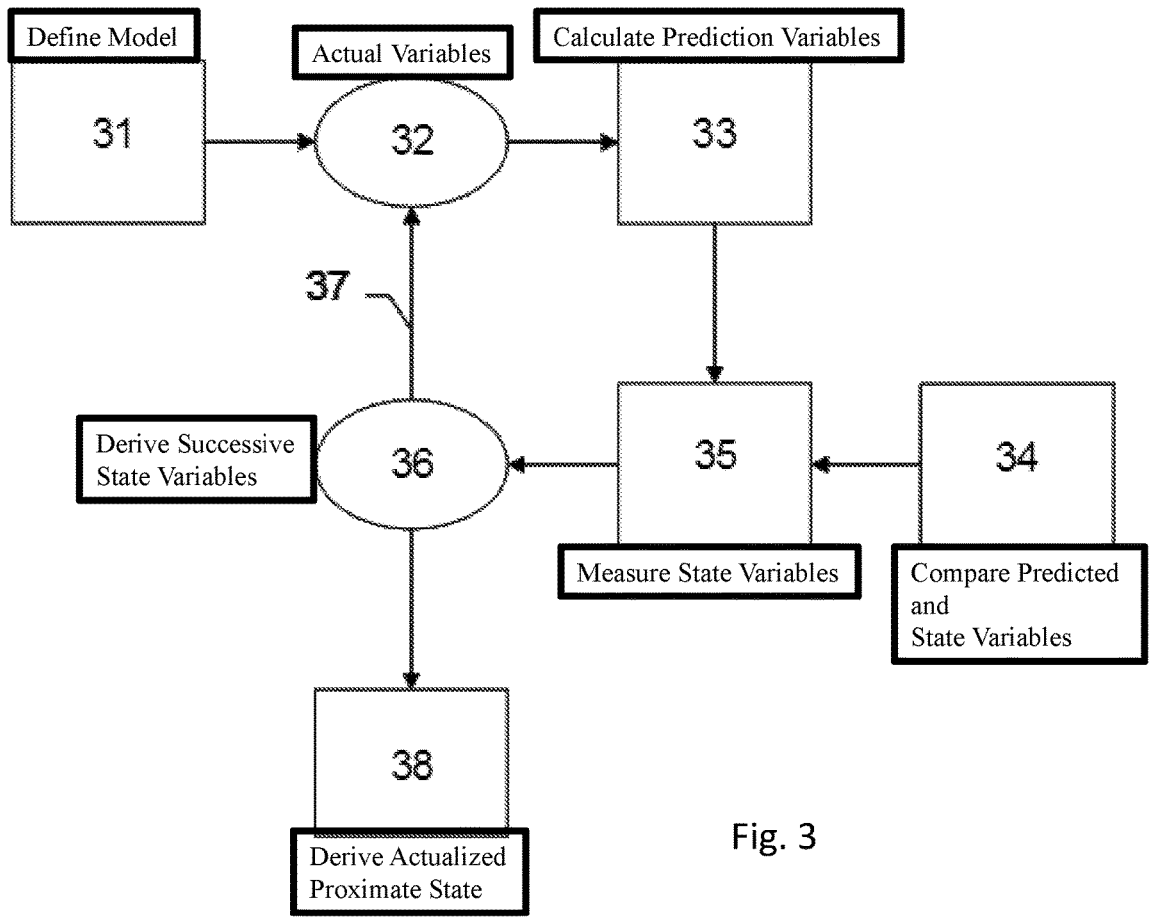
FIG. 3 a block diagram illustrating the general principle of the model and filtering according to a particular embodiment of the invention.

FIG. 3 shows a block diagram illustrating the general principle of modelling and calculating an actual state of a coordinate measuring machine according to a preferred embodiment of the invention.

In a first step 31 a dynamic model representing at least one part of a coordinate measuring machine by a set of actual state variables 32 is defined. The set of state variables represents a set of specific physical parameters of the part of the CMM. Initially, the variables may be set with defined values in order to model an initial model state (and thus the corresponding machine state) of the at least one part of the CMM, in particular of the whole CMM, and defining that initial model state and relating variable values as a starting point. Based on that initial model state a corresponding machine state may be calculated representing a real (initial) state of the part of the CMM. Particularly, in assumption that the machine components are positioned in defined locations and are not moving relative to each other, such initial states may be defined and calculated in very precise and exact manner.

Starting from the actual set of variables 32 (e.g. from the initial state)—according to the invention—prediction variables are calculated 33, describing an expected proximate (successive to the actual) state of at least the part of the CMM. Such a calculation may be based on the dynamic model, wherein the prediction variables 33 are derived from the actual state variables by applying algorithms related to the model, particularly along with their uncertainties. Particularly, parameters for predicting a later state of the CMM are derived for the whole set of state variables, however, the invention also relates to calculating the predictive parameters for only a part of the set of actual state variables 32.

Additionally, the state variables (or at least a part of the variables) and/or the physical properties to which they relate, respectively, are measured 34 (monitored) in order to determine a variation of at least one of the variables. Preferably, the measurements 34 are observed over a defined time period with a defined actualisation interval. Typically, such measured values may comprise random variations and further inaccuracies in dependency of the used sensor (e.g. due to noise of the respective sensor).

In a further step 35 of the filtering process according to the invention, the calculated prediction variables 33 are compared to the observables based on the measurements 34. Based on that comparison 35 a successive set of state variables is derived 36 describing the actualised (successive) state of the CMM. With other words, the estimates (prediction variables) are updated using the measured physical properties (state variables) 34, e.g. using a weighted average function with more weight being given to estimates with higher certainty. Such procedure can be run in real time (as it is recursive) using only the present input measurements and the previously calculated state. No additional past information is required.

The derived successive set of state variables 36 is used to calculate and derive an actualised proximate state 38 of the part of the coordinate measuring machine. As a consequence, the combination of the measured variables and the estimates (prediction variables) enables to produce successive variables 36 that are to more precisely describing the CMM-state than those that would be based on a single measurement or calculation alone. Thus, a proximate state of the CMM can be derived by calculations based on the updated model.

Furthermore, the successive set of state variables 36 (updated estimates) is recursively put into the model 37, in particular wherein the set of state variables 32 used by the model is replaced by the successive set of state variables 36.

Starting from these updated variables, again, the filtering process is repeated as outlined above in loop-like manner. In that context, the filtering may be performed with a defined repetition rate and/or the measuring of the variables (e.g. of the physical properties represented by the variables) may be monitored and observed for a defined time period.

The tracking of changes of the set of state variables and (continues) calculation of the actual machine state by combining estimated/predicted variables and measurements for respective variables allows computing of e.g. the generation and propagation of vibrations and deformations in machine components and, based thereon, the determination of a measuring error and compensation of that error.

FIGS. 4a-e exemplarily illustrate a change of one system variable (acceleration in X-direction) over time and a displacement development caused by that change with respect to reality, to state of the art approaches and to a model/filtering procedure according to the invention.

Figure 4A:
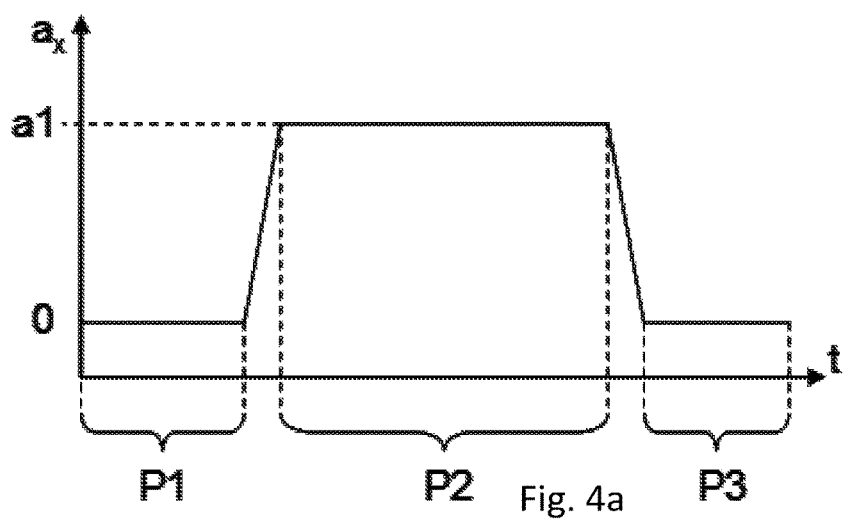

FIG. 4a shows a chart representing an (induced) acceleration $a_x$ of a first point (e.g. readout head mounted on a first frame component for measuring X-position on measuring scale) of a structural component of a CMM in X-direction over time t. For a first time period P1 the point is not accelerated (acceleration $a_x=0$) and e.g. moves with constant velocity in X-direction. After that period P1 the point is positively accelerated until reaching a predefined acceleration value al, which is kept for a second time period P2. Then the point is decelerated (slowed down) until reaching again the acceleration value 0, wherein that state of not accelerating the point is maintained for a third time period P3.

FIG. 4b depicts the displacement behaviour in X-direction $\Delta x$ of a second designated point (e.g. x-direction displacement/deformation of a probe head relative to the first frame component) of the CMM as to an actuation according to FIG. 4a. The real displacement and/or deformation $\Delta x$ over time is shown by line 41. Line 41 represents the displacement behaviour basically as it occurs in reality when changing the acceleration of the first point as shown. In that context it has to be noted that typically the location of the point where the acceleration is induced (first point) differs from the location of the point at which the actual displacement (e.g. caused by the acceleration) is determined (second designated point). As can be seen from line 41, when changing the acceleration value the displacement in X-direction does not change in correspondence but differs from a linear increase of acceleration by vibrations occurring with the position in X-direction. Moreover, additional non-linear peaks may occur according to the acceleration as depicted by 41a.

Such non-linear and dynamical behaviour of a structural component of the CMM occurs e.g. from excitation of natural frequencies of machine components, the excited vibrations which propagate throughout several components of the CMM when a first frame component is moved relative to a second frame component with use of the linear drive mechanism (e.g. as the vibration of the drive is transferred to other machine parts). Thus, vibrations within specific machine parts can be amplified and/or can superimpose and/or can influence other machine parts as well, which may lead to quite complex vibration behaviour of single or a group of machine components.

According to modelling known from prior art, corresponding calculation of the displacement $\Delta x$ does not describe the real vibration behaviour of the structure (designated point) but approximates the X-displacement in quite rough manner. The deformation basically is calculated as an equilibrium position and does not include effects due to dynamic deformations. Such a calculation and a corresponding model are e.g. described in above referenced EP 1 687 589.

FIG. 4c shows a calculated displacement in X-direction $\Delta x$ according to a dynamic model, wherein the calculation is based on an excitation (change of acceleration) of the CMM according to FIG. 4a. The dynamic model is applied for the respective part of the CMM (or for the whole CMM) to calculate the deflection, i.e. the displacement $\Delta x$ of the designated point. Internal system variables and their deviation are employed in order to precisely calculate the deflection and the time history of an excitation (here: change of acceleration) and state variables are used to calculate the deformations. Line 42 shows the calculated result for displacements over time, wherein the displacement is caused by the change of acceleration as shown in FIG. 4a.

By such dynamic modelling and calculating a quite precise result concerning the displacements $\Delta x$ is obtained, which basically represents the behaviour of the structure (i.e. the designated point), but still minor deviations from real deflection values occur. Such a model and calculation approach are described e.g. in the European Application No. EP 13153980.1, filed on 5 Feb. 2013.

FIG. 4d shows a calculated displacement for a CMM in X-direction $\Delta x$ according to the invention. Again, the calculation is based on an excitation (change of acceleration) of the CMM according to FIG. 4a. A dynamic model is designed in order to describe an actual state of the CMM. Predicting variables (estimates) are derived by calculation e.g. from the model, the predicting variables assuming a proximate state of the CMM. Additionally, measurements are performed (for a predetermined time period, in defines intervals), wherein physical properties related to the state variables or the variables themselves are measured and observed. A successive set of variables is generated from combining and comparing the predicting variables with the measurement information, which describes a successive state of the CMM close to reality. Based on that successive set of variables an actualised state of the CMM is derived and the successive set of variables is provided to the model replacing the previous set of state variables. Thus, recursive calculation is provided by (continuously) updating the variables and repeating the calculation accordingly.

With such calculations the state of the structure and/or the position of the designated second point of the CMM can be tracked over time. Line 43 shows the result of such modelling and calculation (filtering). As can be seen (especially from FIG. 4e) from the course of the chart 43 a model-based description of the machine or of only parts of the machine according to the invention fits best (compared to modelling calculating according to prior art) to realistic behaviour of the machine and represents occurring effects in the machine very precise as to reality. As depicted with the line 43 in the region of 43a, even non-linear peaks occurring in reality are enabled to be calculated at least basically.

For better overview, the really occurring deformations (displacements) and the modelled displacements of FIGS. 4b-d are shown together in FIG. 4e. As before, line 41 shows the real behaviour and lines 42 and 43 show a calculated displacement according to a known dynamic model (cf. FIG. 4c) and according to filtering according to the invention (cf. FIG. 4d). It can be seen that line 43 (generated with a model according to the invention) represents a quite near approach to the really occurring displacement and, thus, is closest to reality and most suitable to calculate an actual state of a CMM.

Deflection values calculated according to the invention may be used to correct a measured probe position value (e.g. a measured position of a measuring point on an object to be measured) and, thus, to reduce errors due to a dynamic behaviour of the CMM. The errors may be corrected due to both static and dynamic effects (including natural frequencies).

Therefore, a dynamic modelling, filtering and calculating according to the invention enables to derive actual vibration states of a CMM and provides to compensate for errors caused by machine vibrations very precisely.

Although the invention is illustrated above, partly with reference to some specific embodiments, it must be understood that numerous modifications and combinations of different features of the embodiments can be made and that the different features can be combined with modelling and calculation principles and/or coordinate measuring machines known from prior art.

What is claimed is:

1. A method for providing dynamic state information for at least a part of a coordinate measuring machine, the coordinate measuring machine comprising:
    a base;
    a probe head;
    a machine structure with structural components for linking the probe head to the base; and
    at least one drive mechanism for providing movability of the probe head relative to the base,
    wherein the following steps are carried out for execution of the method:
    defining a dynamic model with an actual set of state variables, the state variables being related to a set of physical properties of at least the part of the coordinate measuring machine and representing an actual state of at least the part of the coordinate measuring machine; and
    deriving the actual state of at least the part of the coordinate measuring machine by a calculation based on the dynamic model;
    executing a filtering process with the dynamic model, the filtering process including:
        deriving a set of prediction variables based on the state variables, the set of prediction variables describing an expected proximate state of at least the part of the coordinate measuring machine;
        measuring at least one of the physical properties and determining a set of observables based on the measuring;
        deriving a set of successive state variables by comparing the set of prediction variables with the set of observables, the successive state variables providing an adjusted representation of the proximate state of at least the part of the coordinate measuring machine; and
        updating the dynamic model using the set of successive state variables as the actual set of state variables.

2. The method according to claim 1, wherein:
an actual position and/or displacement of a designated point and/or an actual deformation of at least the part of the coordinate measuring machine is derived based on the dynamic model.

3. The method according to claim 2, wherein:
the position of the designated point and/or the actual deformation is tracked for a predetermined time period.

4. The method according to claim 1, wherein:
the filtering process uses Kalman filtering.

5. The method according to claim 1, wherein:
the prediction variables are derived performing calculations based on the dynamic model.

6. The method according to claim 1, wherein:
the filtering process is performed in predefined time intervals; and
wherein the measuring of the at least one physical property is observed for a predefined time period.

7. The method according to claim 1, further comprising:
adapting at least one of the successive state variables of the set of successive state variables to the prediction variables and/or to the observables of the set of observables.

8. The method according to claim 1, further comprising:
deriving a compensation value by calculating a weighted average from the set of prediction variables and the set of observables, wherein at least one successive state variable is adjusted to the compensation value.

9. The method according to claim 8, wherein:
the compensation value is derived from a defined prediction variable and a respective observable, the prediction variable, the observable and the successive state variable relating to the same physical property.

10. The method according to claim 1, further comprising:
determining an error value by processing the set of prediction variables and the set of observables.

11. The method according to claim 10, wherein:
determining the error value comprises at least one of:
    determining the error value for at least one of the successive state variables by comparing a measuring value of at least one respective physical property with a predicted value for the respective variable; and adapting at least one successive state variable based on the error value.

12. The method according to claim 1, wherein:
sensor data generated by a measurement with a respective sensor:
is used for deriving the set of observables; and/or
is filtered and adapted without phase delay based on the filtering process to reduce sensor noise.

13. The method according to claim 1, wherein:
the filtering process is performed using at least one of:
a linear quadratic estimator;
a recursive filtering procedure;
a Kalman-Filter; and
an Extended Kalman-Filter.

14. The method according to claim 1, wherein:
the state variables, the prediction variables, the observables and/or the successive variables define at least one of the following values and/or a change of the respective value of at least the part of the coordinate measuring machine:
mass;
inertia;
geometrical property;
stiffness;
damping;
bearing property;
torque;
temperature;
humidity;
velocity; and/or
applied force.

15. The method according to claim 1, further comprising:
calculating a settling time and generating a settling signal based on the filtering procedure for compensation of a measurement performed with the coordinate measuring machine, wherein the settling time represents a duration for maintaining a defined measuring position in order to achieve predefined measuring accuracy.

16. The method according to claim 15, wherein:
the settling signal is processed for at least one of:
controlling a repositioning of a defined position of the probe head relative to a measuring point;
maintaining of the defined position of the probe head relative to the measuring point; and
generating an output signal for providing information for an operator in order to manually measure with the predefined measuring accuracy.

17. A coordinate measuring machine comprising:
a base;
a probe head;
a machine structure with structural components for linking the probe head to the base;
at least one drive mechanism for providing movability of the probe head relative to the base; and
a controlling and processing unit adapted for execution of a modelling functionality, on execution of which:
a dynamic model with an actual set of state variables is defined, the state variables being related to a set of physical properties of at least the part of the coordinate measuring machine and representing an actual state of at least a part of the coordinate measuring machine; and
the actual state of at least the part of the coordinate measuring machine is derived by a calculation based on the dynamic model,
wherein the modelling functionality includes a filtering algorithm, on execution of which
a set of prediction variables is derived based on the state variables, the set of prediction variables describing an expected proximate state of at least the part of the coordinate measuring machine;
at least one of the physical properties is measured and a set of observables is determined based on the measurement;
a set of successive state variables is derived by comparing the set of prediction variables with the set of observables, the successive state variables providing an adjusted representation of the proximate state of at least the part of the coordinate measuring machine; and
the dynamic model is updated using the set of successive state variables as the actual set of state variables.

18. The coordinate measuring machine according to claim 17, wherein:
the controlling and processing unit of the coordinate measuring machine is adapted for execution of a method according to claim 1.

19. The coordinate measuring machine according to claim 17, further comprising:
a sensor having a sensor gain is adjustable based on the calculation of the dynamic model for monitoring the physical properties, the sensor including at least one of:
an acceleration sensor;
a deflection sensor;
a vibration pick-up.

20. A computer program product having a non-transitory computer-readable medium carrying computer-executable instructions for performing the method of one of claim 1 executed on a controlling and processing unit of a coordinate measuring machine according to claim 17.

* * * * *